T. CLARKSON.
FEED WATER SUPPLY APPARATUS FOR STEAM GENERATORS.
APPLICATION FILED JULY 2, 1917.

1,252,239.

Patented Jan. 1, 1918.
2 SHEETS—SHEET 1.

UNITED STATES PATENT OFFICE.

THOMAS CLARKSON, OF CHELMSFORD, ENGLAND.

FEED-WATER-SUPPLY APPARATUS FOR STEAM-GENERATORS.

1,252,239.   Specification of Letters Patent.   Patented Jan. 1, 1918.

Application filed July 2, 1917. Serial No. 178,279.

*To all whom it may concern:*

Be it known that I, THOMAS CLARKSON, subject of the King of England, residing at Chelmsford, Essex, in England, have invented certain new and useful Improvements in Feed-Water-Supply Apparatus for Steam-Generators, of which the following is a specification.

This invention relates to feed-water supply apparatus for steam generators and has particular reference to float-controlled apparatus such as is sometimes used with steam generators for self-propelled road vehicles; the application of the invention, however, is not necessarily limited to such generators.

In a float-controlled feed-water supply apparatus the float is sometimes arranged so that its motion turns a spindle and it has been proposed to render the float and spindle sensitive to variation in the level of the water by subjecting the spindle to a reciprocating motion in the direction of the axis of the spindle. The present invention is concerned with an improved construction of the float spindle and the operating mechanism which imparts to it this reciprocating motion.

According to this invention the spindle of the float is operated by a rod or plunger in axial alinement with the float spindle the adjacent ends of the spindle and the rod being formed of hardened surfaces, one preferably plane and the other convex the two hardened surfaces being in contact.

The hardened surfaces and the adjacent portions of the float spindle and rod are inclosed in a sleeve in which they can slide freely and outside this sleeve links are provided connected to the rod and to a sleeve through which the float spindle passes freely. One end of this sleeve is arranged to bear against a collar or abutment on the spindle. Through some convenient mechanism a slow reciprocating motion is imparted to the rod and transmitted by it to the float spindle.

Figure 1:
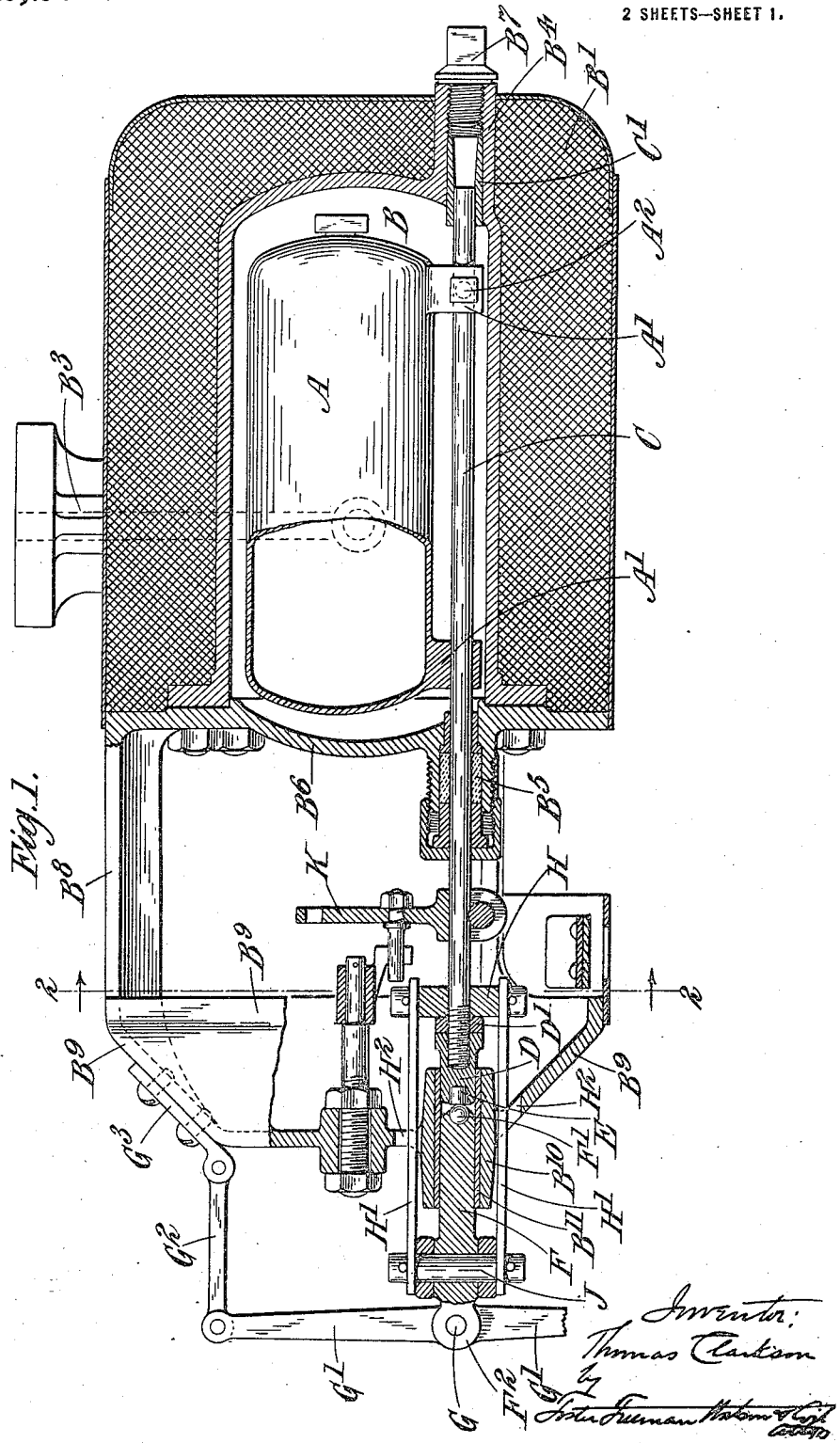
Figure 2:
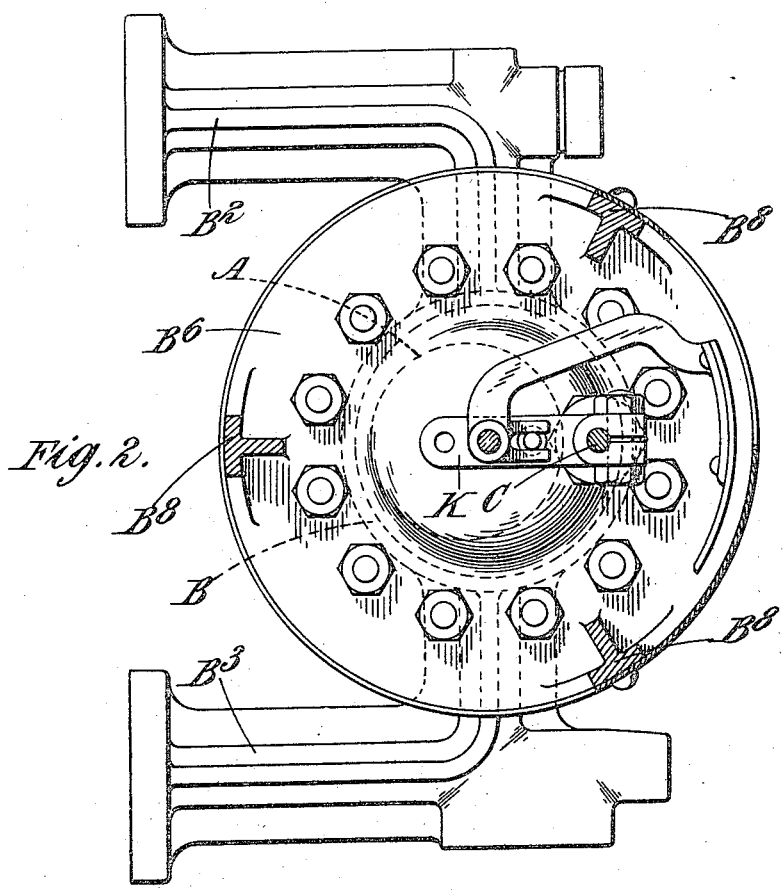

In the accompanying drawings which illustrate one convenient construction of an apparatus according to this invention, Figure 1 is a plan partly in section, and Fig. 2 is an end elevation partly in section on the line 2—2 of Fig. 1.

Like letters indicate like parts throughout the drawings.

In the construction illustrated the float is in the form of a hollow cylindrical body A contained in a float chamber B provided with lagging B' and mounted with its axis horizontal upon some convenient part of the steam generator. The float chamber B is so positioned and its connections $B^2$ $B^3$ are such that the normal water level in the steam generator will correspond approximately to the axis of the float chamber.

On one side of the float A near each end lugs A' are welded or otherwise attached to it and a spindle C passes through these lugs and is secured in position by set screws one of which is indicated at $A^2$ in Fig. 1. One end of the spindle C rests slidably in a bearing C' in a boss $B^4$ formed at one end of the float chamber B and the other end of the spindle C projects through a stuffing box $B^5$ formed on the cover $B^6$ of the float chamber. The boss $B^4$ is drilled through and its end is closed by a screw plug $B^7$ which can be removed to allow of inspection and the occasional insertion of a small quantity of lubricant.

The cover $B^6$ of the float chamber is bolted on to the chamber and is provided with angle arms $B^8$ which support a circular shield or cone $B^9$. In the example illustrated the cover $B^6$, arms $B^8$ and shield $B^9$ are integral with each other but this need not necessarily be the case as they may be separate members secured in any convenient way. The shield or cone $B^9$ is formed with a sleeve $B^{10}$ having a lining sleeve $B^{11}$ in axial alinement with the spindle C projecting through the stuffing box $B^5$. The end of the spindle C is screwed and furnished with a cap D forming an extension of the spindle and locked in position thereon by a nut D'. This cap D is of sufficient length to extend into the sleeve $B^{11}$ and its end is drilled centrally to accommodate a hardened steel roller E the flat end of the roller forming the central portion of the end of the cap D. This roller is kept in position by burring the edges of the hole in which it is inserted or in any other convenient way.

Passing through the sleeve $B^{11}$ from the outer end is a short rod or plunger F having at its inner end a hardened steel ball F' which, like the roller E, may be kept in place by burring the edge of the hole made to receive it. This ball F' is positioned centrally and consequently bears against the center of the flat end of the hardened roller E. At the other end of the rod or plunger F is an eye F² connected by a pin G to a lever G' which, at its upper extremity, is pivoted to a link G² mounted as at G³ on the shield B⁹. The other end of this lever G' is connected in any convenient way to some member which will give it a slow reciprocating movement.

Fitting loosely around the spindle C is a disk or sleeve H bearing against the lock nut D' and this sleeve H is connected by links H' which pass freely through holes H² in the shield B⁹ and have their other ends connected by a pin J which passes through the two rods and through the rod or plunger F.

When the lever G' is moved inward the hardened ball F' on the inner end of the plunger F presses against the hardened surfaces of the roller E at the end of the spindle C and causes that spindle and the float A to move longitudinally relatively to the float chamber B and when the lever G' is moved in the opposite direction the links H', acting through the disk or sleeve H encircling the spindle C, pull that spindle and the float back into their original position. This motion which is slow and continuous insures that the float shall keep sensitive so that it may rise and fall with any difference in the level of the water in the float chamber and in thus rising and falling rotary motion is imparted to the float spindle C.

Upon the float spindle C is mounted the usual arm K which may serve as an indicator and can also be used through any suitable mechanism, not shown in detail in the drawings, to control the supply of water to the steam generator.

The sleeve B¹⁰ B¹¹ does not merely act as a guide and bearing for the plunger F but also guides and protects the float spindle C. This is an important function for it enables the float spindle which must necessarily extend outward from the float chamber for an appreciable length, to be made of small diameter thus insuring lightness and reducing friction to a minimum.

Obviously the sleeve B¹⁰ B¹¹ might be supported by any form of spider or support which held it in alinement with the axis of the spindle C but it is preferred to support it by the conical shield B⁹ so that that member may act as a guard or casing and give further protection to the float spindle C.

Conveniently the float spindle is made of stainless steel or some other alloy which resists the action of water and does not rust.

The hardened flat-ended roller E and the ball F' are convenient means of providing hard and frictionless points of contact between the plunger F and the end of the float spindle but these and other details of construction may be varied without departing from the spirit of this invention.

What I claim as my invention and desire to secure by Letters Patent is:—

1. In a feed water supply apparatus for a steam generator the combination of a float chamber, a spindle capable of sliding and partially rotating in bearings in said float chamber, a float mounted on the spindle, a plunger or rod slidably supported in axial alinement with the float spindle and means for imparting to such plunger or rod a slow reciprocating movement for the purpose set forth.

2. In a feed water supply apparatus for a steam generator the combination of a float chamber, a spindle capable of sliding and partially rotating in bearings in said float chamber, a float mounted on the spindle, a plunger or rod slidably supported in axial alinement with the float spindle, the adjacent ends of the plunger and of the spindle being furnished with hardened surfaces one plane and the other convex and means for imparting a slow reciprocating movement to the plunger or rod for the purpose set forth.

3. In a feed water supply apparatus for a steam generator the combination of a float chamber, a spindle capable of sliding and partially rotating in bearings in said float chamber, a float mounted on the spindle, a plunger or rod slidably supported in axial alinement with the float spindle, the adjacent ends of the plunger and of the spindle being furnished with hardened surfaces one plane and the other convex, means for imparting a slow reciprocating movement to the rod and operative connections between the plunger and the float spindle for the purpose set forth.

4. In a feed water supply apparatus for a steam generator the combination of a float chamber, a spindle capable of sliding and partially rotating in bearings in said float chamber, a float mounted on the spindle, a sleeve or bearing separate from the float chamber, a cap mounted on the float spindle having a hardened center and arranged to slide in the sleeve, a plunger or rod slidably supported in the sleeve with its free end in contact with the hardened center of the cap on the rod, means for reciprocating the plunger or rod and means for transmitting such reciprocating movement to the float spindle for the purpose set forth.

5. In a feed water supply apparatus for a steam generator the combination of a float chamber, a spindle capable of sliding and partially rotating in bearings in said float chamber, a float mounted on the spindle, a sleeve or bearing separate from the float chamber, a cap mounted on the float spindle having a hardened center and arranged to slide in the sleeve, a plunger or rod slidably supported in the sleeve with its free end in contact with the hardened center of the cap on the rod, a collar or sleeve loosely mounted on the float spindle, links connecting the loose collar or sleeve and the plunger or rod and means for imparting a slow reciprocating movement to the plunger or rod for the purpose set forth.

In testimony whereof I have signed my name to this specification in the presence of two subscribing witnesses.

THOMAS CLARKSON.

Witnesses:
J. PHILLIPS CRAWLEY,
W. J. SKERTEN.

Copies of this patent may be obtained for five cents each, by addressing the "Commissioner of Patents, Washington, D. C."